(12) United States Patent
Jean et al.

(10) Patent No.: US 12,517,475 B2
(45) Date of Patent: Jan. 6, 2026

(54) METHOD FOR ADJUSTING PARAMETERS OF A COATING PROCESS TO MANUFACTURE A COATED TRANSPARENT SUBSTRATE

(71) Applicant: SAINT-GOBAIN GLASS FRANCE, Courbevoie (FR)

(72) Inventors: Cyril Jean, Paris (FR); Thierry Kauffmann, Pantin (FR); Matthieu Loustaunau, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 85 days.

(21) Appl. No.: 18/571,047

(22) PCT Filed: Jun. 16, 2022

(86) PCT No.: PCT/EP2022/066452
§ 371 (c)(1),
(2) Date: Dec. 15, 2023

(87) PCT Pub. No.: WO2022/263586
PCT Pub. Date: Dec. 22, 2022

(65) Prior Publication Data
US 2024/0280948 A1    Aug. 22, 2024

(30) Foreign Application Priority Data
Jun. 17, 2021 (EP) .................................... 21180077

(51) Int. Cl.
*G05B 13/02* (2006.01)
*C03C 17/36* (2006.01)
*G05B 19/418* (2006.01)

(52) U.S. Cl.
CPC ...... *G05B 13/0265* (2013.01); *C03C 17/3642* (2013.01); *G05B 19/418* (2013.01);
(Continued)

(58) Field of Classification Search
CPC ...... G05B 2219/39233; G05B 13/0265; G05B 19/41885
See application file for complete search history.

(56) References Cited

U.S. PATENT DOCUMENTS

| 2018/0314148 A1 | 11/2018 | Tetiker et al. |
| 2020/0026196 A1 | 1/2020 | Luo et al. |
| 2020/0392617 A1 | 12/2020 | Faucillon et al. |

FOREIGN PATENT DOCUMENTS

| DE | 10 2018 101173 A1 | 7/2019 |
| EP | 3 944 030 A1 | 1/2022 |

(Continued)

OTHER PUBLICATIONS

International Search Report as issued in International Patent Application No. PCT/EP2022/066452, dated Oct. 10, 2022.

*Primary Examiner* — Alex A Rolland
(74) *Attorney, Agent, or Firm* — Pillsbury Winthrop Shaw Pittman LLP

(57) ABSTRACT

A method for adjusting at least two parameters of a coating process to manufacture a coated transparent substrate including a multi-layered coating according to a targeted value for at least one quality function for the coated transparent substrate. The method relies on a set of different mathematical prediction models in the training procedure, which, once trained, when they are used either sequentially, alternatively or in parallel, during the prediction procedure, allow to counteract or counterbalance drifts that may potentially occur from one of them. Outstanding benefits are that misbehaviours of current feedback methods may be prevented, that changes in the local atmosphere of deposit cells, and in turn in the chemistry of coated layers, which may occur from temperature and/or humidity variation, may be compensated, and that more than one coating process parameters may be adjusted at the same time.

15 Claims, 4 Drawing Sheets

(52) U.S. Cl.
CPC ............... *G05B 19/41885* (2013.01); *G05B 2219/32216* (2013.01); *G05B 2219/36252* (2013.01)

(56) References Cited

FOREIGN PATENT DOCUMENTS

| | | | | |
|---|---|---|---|---|
| JP | 2015127914 A | * | 7/2015 | |
| WO | WO 2018/215274 A1 | | 11/2018 | |
| WO | WO-2019110948 A1 | * | 6/2019 | ......... C23C 14/3492 |
| WO | WO 2020/193095 A1 | | 10/2020 | |

* cited by examiner

METHOD FOR ADJUSTING PARAMETERS OF A COATING PROCESS TO MANUFACTURE A COATED TRANSPARENT SUBSTRATE

CROSS-REFERENCE TO RELATED APPLICATIONS

This application is the U.S. National Stage of PCT/EP2022/066452, filed Jun. 16, 2022, which in turn claims priority to European patent application number 21180077.6 filed Jun. 17, 2021. The content of these applications are incorporated herein by reference in their entireties.

TECHNICAL FIELD

The invention pertains to methods for adjusting parameters of a coating process to manufacture a coated transparent substrate comprising a multi-layered coating according to a targeted value for at least one quality function for said coating transparent substrate.

BACKGROUND ART

Multi-layered coatings are used to functionalize surfaces of a wide range of substrates, particularly transparent substrates such as mineral or organic glass. They provide optical properties and/or functionalities that suit specific applications.

For example, in the building industry, surfaces of glass sheets are often coated with multi-layered low-emissivity or solar control coatings. Such coatings are stacks of a plurality of chemically and/or physically different thin layers which interact with each other and alter the incident solar radiation falling on the surfaces of glass panes.

These coatings usually contain infrared-reflective metallic layers, mainly made of metals such as silver, gold, niobium, or copper, to reduce heat and/or radiation transfer through the glass panes. These metallic layers are often combined with dielectric layers, mainly through sandwiching configurations, to counterbalance colour shifts, reflection and/or transmission effects that are due to said metallic layers, and to adjust the solar factor or heat emission rate, also called emissivity. Other layers, either metallic or dielectric, may also be used in the coating to improve thermal and/or structural stability over time, during use, or upon subsequent transformations such as heating, tempering and/or bending.

Coating processes to deposit mono- or multi-layered coating on substrates are well-known processes in glass industry. A stack of thin films is coated on a mineral glass substrate by the successive deposits of each thin film of said stack by conveying the glass substrate through a succession of deposit cells adapted to deposit a given thin film. The deposit cells may use deposit methods such as magnetic field assisted sputtering (also called magnetron sputtering), ion beam assisted deposition (IBAD), evaporation, chemical vapour deposition (CVD), plasma-enhanced chemical vapour deposition (PECVD), low pressure chemical vapour deposition (LPCVD).

To ensure that the coated substrates fulfil the specifications regarding optical properties, such as solar gain, light transmission, light reflection and/or color, quality tests may have to be carried out before starting production, i.e., during setup time, and during the production time.

A frequent practice may be to carry out off- or in-process measurements on collected samples to ensure that requirements are met throughout the entire coating process. These measurements may be either destructive or non-destructive depending mainly on the availability of measuring instruments. Off-process measurements may be destructive whereas in-process measurements may be not. For off-process measurements, samples may have to be cut from the coated substrates at given times during production. In some cases, samples may have also to undergo transformation, e.g., lamination, heating, tempering, before to be analysed. Disruption and lag times between measurements and corrections of process parameters may be prejudicial for the production.

It is known in the prior art, for example in WO 2019110948 A1, WO 2018215274 A1, DE 102018101173 A1 or WO 2019/110948 A1, to use feedback methods that implement one or several feedback loops for real-time control and/or adjustment of parameters of a deposit system or deposit cells in function of shifts in values of selected optical and/or physicochemical properties of the deposited coating. These properties are measured on the coating during the coating process. These methods are called online methods as they rely on a continuous real-time monitoring of parameters of the deposit system or deposit cells, and continuous real-time measurements of optical and/or physicochemical properties of the coating at distinct stages during the coating process.

Online feedback methods may also often require continuous collection and processing of considerable amounts of data, either for the feedback loops to work or to correctly train the underlying algorithms in those feedback loops. This data may relate to parameters of the components of the coating system and/or to optical/physicochemical properties of the coated substrates. To collect them, the coating system may be instrumented with various sensors and measuring devices, e.g., high data acquisition chips, I/O electronic devices, programmable logic devices, pressure sensors, temperature sensors, vacuum sensors, gas sensors, speed rate sensors, spectrometer, ellipsometer, sheet resistivity probe systems, optical interferometers, or similar devices. Sensors and measuring devices may become rapidly expensive and, it may be preferable to limit their use.

SUMMARY OF THE INVENTION

Technical Problem

A limitation of prior art feedback methods may be that they do not allow to manage possible drifts in the accuracy and/or precision of the measuring instruments between setup time and production time and/or during the production time. Unexpected and not immediately detectable misbehaviours in feedback loops may occur and products may be out-of-specifications.

Same effect may appear when the surrounding environment of the coating process has changed or is changing. For instance, temperature and/or humidity variation may affect the local atmosphere of the deposit cells of the coating process and induce change in the chemistry of the layer being coated in those cells.

Another limitation may be that current feedback methods may be often ineffective when some features of the coating like, for instance, optical index of the materials in layers or relative thickness difference between layers, differ from the targeted coating. The underlying algorithms of the feedback loop may be trapped in local but non global optimal solutions, so that specification for products may not be met.

There is a need for a feedback method which may be able to provide auto-adjusted parameters of coating process parameters to manufacture a coated transparent substrate, and which may allow to manage possible drifts regarding the accuracy and/or precision of components or equipment devices of the coating process and/or some changes in the features of the coated substrates.

Solution to Problem

There is provided a method for adjusting at least two parameters of a coating process according to claim 1, dependant claims being advantageous embodiments.

Advantages of the Invention

An outstanding advantage of the invention is that misbehaviours of current feedback methods may be prevented. Without being a limiting explanation, this advantage may seem to be achieved thanks to the set of different mathematical prediction models in the training step, which, once trained, when they are used either sequentially, alternatively or in parallel, during the prediction step, allow to counteract or counterbalance drifts that may potentially occur from one of them.

As a correlative advantage, this feature may also allow to compensate changes in the local atmosphere of deposit cells, and in turn in the chemistry of coated layers, which may occur from temperature and/or humidity variation, in particular, in the surrounding atmosphere of the coating process.

A further advantage is that the risk to be trapped during the optimisation step in an attraction basin and, then into a local optimum, may be reduced.

Comparing to current feedback methods, the invention allows to adjust more than one coating process parameters at the same time. A direct positive result is that the parameters of a coating process may be adjusted or optimized more rapidly and more efficiently according to a targeted value for a quality function. Further, the method allows a more efficient management of any potential interconnection between coating process parameters, whereas current feedback methods while allowing to adjust coating process parameters one after other and/or independently to each other may fail to overcome any conflicting variations of some coating process parameters.

Another valuable advantage from certain embodiments of the invention may be the possibility to live update the targeted value for the quality function during the adjustment stage of the coating process. Such flexibility may be useful when one may want to change, on purpose or as a remedy, the technical requirements during the setup time and/or during the production time.

Additional advantages of the embodiments are set forth in the detailed description and the drawings.

DETAILED DESCRIPTION OF EMBODIMENTS

Except otherwise stated or technically incompatible, all the embodiments described herein may be combined.

Figure 1:
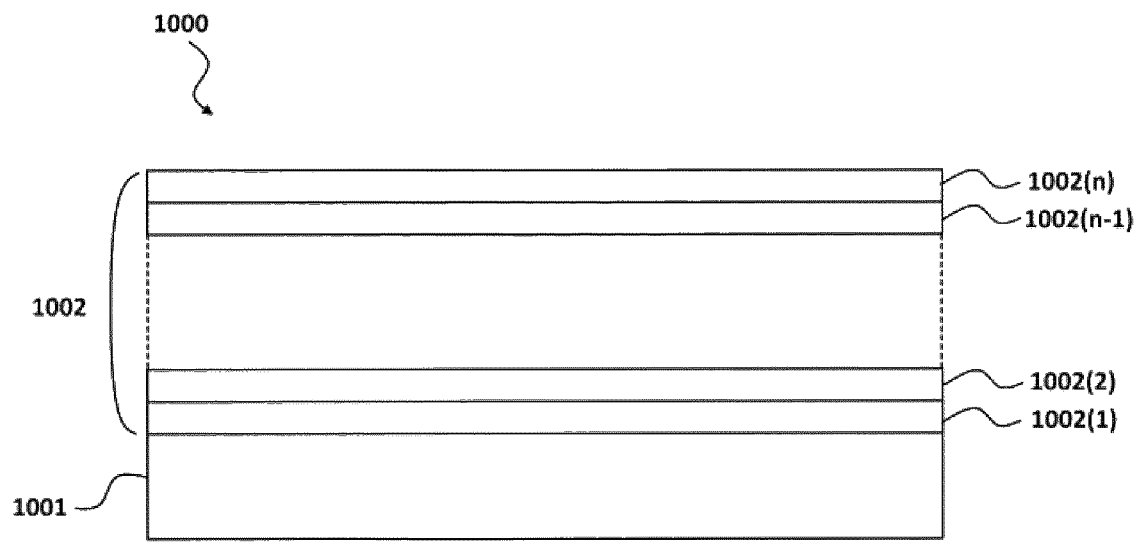
FIG. 1 is a schematic representation of layered coating on a substrate.

With reference to [FIG. 1], a coated transparent substrate 1000 may commonly comprise a transparent substrate 1001 with a layered coating 1002 on one of its main faces. The coating 1002 may be a multi-layered coating, i.e., comprising several layers 1002(1)-1002(n).

The coating 1002 may be a mono- or multi-layered coating comprising at least one dielectric layer and one functional layer. As illustrative example, for building or automotive glass application, the functional layer may be an infrared-reflective metallic layers, mainly made of metals such as silver, gold, niobium, or copper, to reduce heat and/or radiation transfer through the transparent glass panes. There may be more than one functional, e.g., two, three or more functional layer, eventually combined with dielectric layers, mainly through sandwiching configurations. The dielectric layers may help to counterbalance or adjust colour shifts, reflection and/or transmission effects that are due to said metallic layers, and to provide the sought solar factor or heat emission rate, also called emissivity.

The coating 1002 may also comprise other layers, either metallic of dielectric, to improve thermal and/or structural stability over time, during use, or upon subsequent transformations such as heating, tempering and/or bending.

The substrate 1001 may be a transparent substrate such as mineral glass substrate or organic substrate. In the context of the invention, a transparent glass means a glass through which at least part of electromagnetic radiation may be transmitted in the visible spectrum so that the shape and possibly some details of an object which may be observed through that said glass can be distinguished. The substrate may be a thin, rigid, or flexible, substrate.

A transparent glass may be organic or mineral glass. Examples of mineral glass may be sodalime glass, aluminosilicate glass or borosilicate glass. Examples of organic transparent glass are poly(methyl methacrylate) (PMMA) or polycarbonate (PC) polymers.

Figure 2:
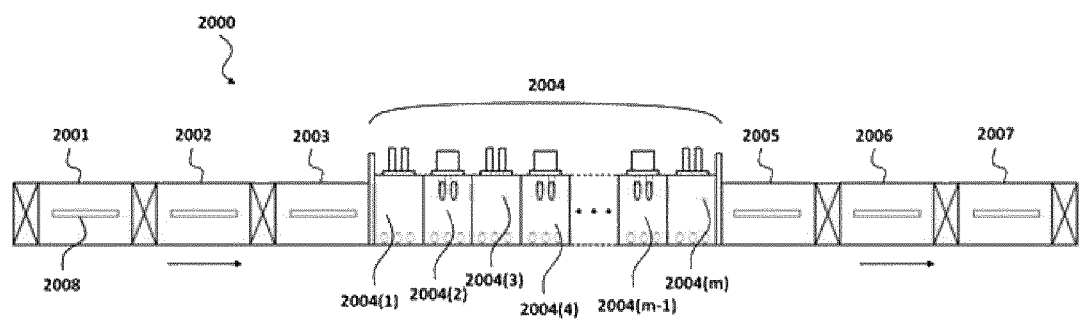
FIG. 2 is a schematic representation of a coating process to deposit mono- or multi-layered coating on a substrate.

With reference to [FIG. 2], a coating process may be illustrated by a deposit system 2000 comprising juxtaposed cells through which a transparent substrate 2008 may be successively conveyed. Transparent substrates may be conveyed in sequence, one after the other, so that there may be several transparent substrates in same time in the deposit system. A substrate may be located in one cell or in several cells in same time depending to its size.

The deposit system may comprise an input cell 2001 into which the transparent substrate enters, a first buffer cell 2002, a first transfer cell 2003, a deposit section 2004, a second transfer cell 2005, a second buffer cell 2006 and an output cell 2007 from which exits the coated substrate 2008. The deposit section 2004 may comprise a succession of deposit cell 2004(1)-2004(m). Each deposit cell may be featured with means for depositing coating, e.g., magnetic field assisted sputtering (also called magnetron sputtering) system, ion beam assisted deposition (IBAD) system, evaporation system, chemical vapour deposition (CVD) system, plasma-enhanced chemical vapour deposition (PECVD) system or low-pressure chemical vapour deposition (LPCVD) system. Deposit cells 2004(1)-2004(m) may also comprise pumping systems to create the vacuum conditions that suit deposition.

Figure 3:
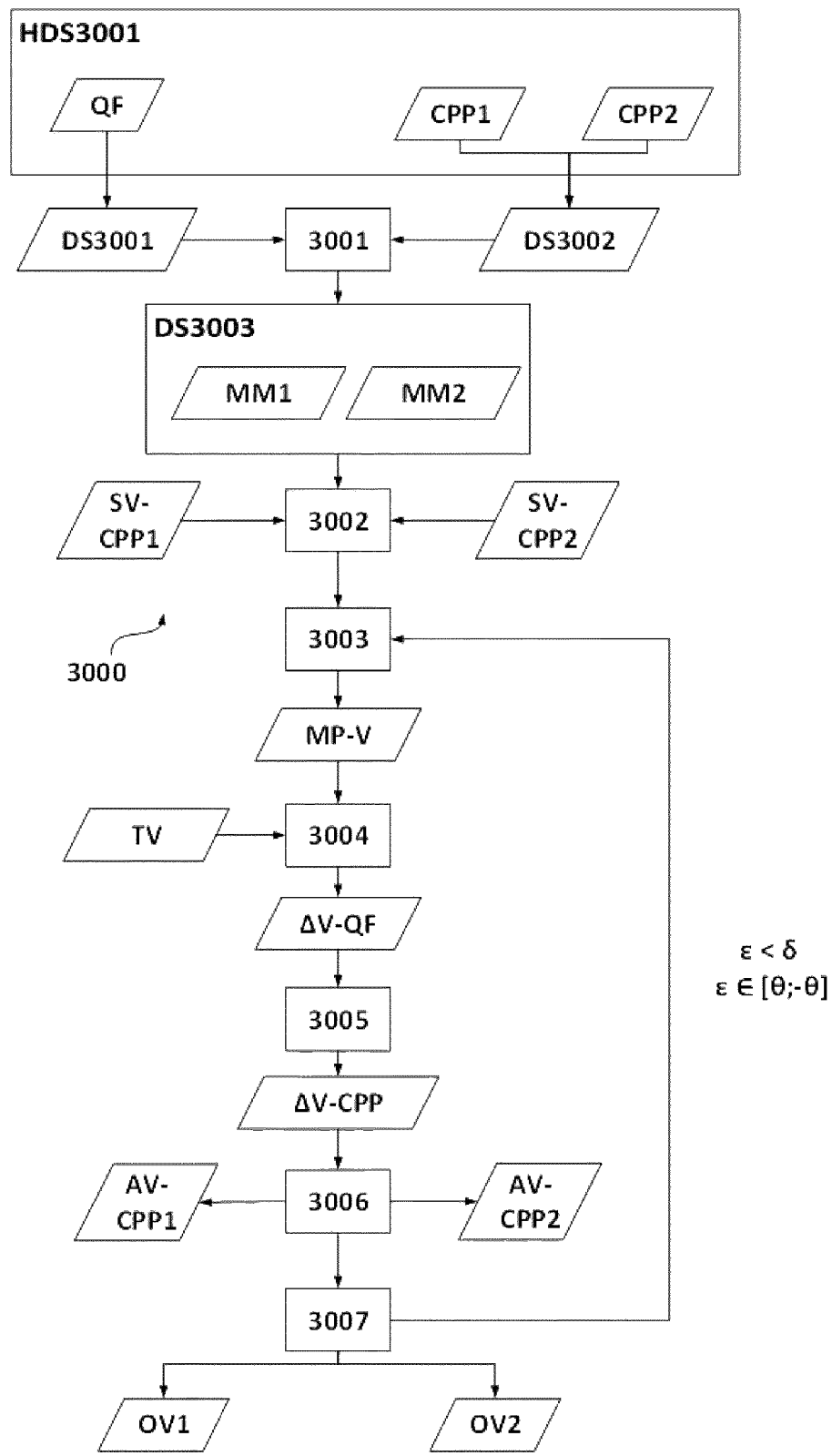
FIG. 3 is a flow chart of a method for adjusting coating process parameters according to one embodiment.

With reference to [FIG. 3], in one embodiment of the invention, there is provided a method (3000) for adjusting at least two parameters (CPP1, CPP2) of a coating process (2000) to manufacture a coated transparent substrate (1000) comprising a multi-layered coating (1002) according to a targeted value (TV) for at least one quality function (QF) for said coated transparent substrate (1000), wherein said method (3000) takes, as input, a dataset (DS3001) of values for at least one quality function (QF) and a dataset (DS3002) of values for at least two coating process parameters (CPP1, CPP2);

wherein said datasets (DS3001, DS3002) come from a manufacturing history dataset (HDS3001) of coated transparent substrates in one or more coating systems;

wherein said method (3000) provides, as output, optimized values (OV1, OV2) for the at least two coating process parameters (CPP1, CPP2) to manufacture said coating transparent substrate (1000), and wherein said method (3000) comprises the following steps:

(a) computing (3001), on a computer, a dataset (DS3003) of at least two different mathematical prediction models (MM1, MM2) between differences of the values of the at least one quality functions (QF) and differences of the values of the at least two coating process parameters (CPP1, CPP2), wherein said models (MM1, MM2) are based on different machine learning methods, and wherein said different machine learning methods are trained on differences of the values of the dataset (DS3001) for the at least one quality function (QF) as features data and on differences of the values of the dataset (DS3002) for the at least two coating process parameters (CPP1, CPP2) as target data;

(b) manufacturing (3002) a coated transparent substrate with standard values (SV-CPP1, SV-CPP2) for the at least two process parameters (CPP1, CPP2);

(c) measuring or predicting (3003) a value (MP-V) of the at least one quality function (QF) of said manufactured coated transparent substrate;

(d) computing (3004) the difference (ΔV-QF) between the measured or predicted value (MP-V) of the said at least quality function (QF) and a targeted value (TV) for said at least one quality function (QF);

(e) computing (3005), on a computer, differences (ΔV-CPP) for the at least two coating process parameters (CPP1, CPP2) from said difference of measured or predicted value (MP-V) for said at least one quality function (QF) with each mathematical prediction models (MM1, MM2) of the dataset (DS3003);

(f) manufacturing (3006) a coated transparent substrate with adjusted values (AV-CPP1, AV-CPP2) for the at least two coating process parameters (CPP1, CPP2) which are adjusted according to differences computed at step (c);

(g) reiterating (3007) steps (c) to (f) until the targeted value (TV) for the quality function (QF) is reached according to a given error interval or until the variation of said at least two coating process parameter (CPP1; CPP2) is below a given threshold upon subsequent iteration, the values obtained for the at least two coating process parameters (CPP1;CPP2) to reach said targeted value (TV) for the quality function (QF) are the optimized values (OV1,OV2) of the said at least two coating process parameters (CPP1,CPP2).

At step (a), the dataset (DS3001) of values for at least one quality function (QF) and the dataset (DS3002) of values for at least two coating process parameters (CPP1, CPP2) come from a manufacturing history dataset (HDS3001). In the context of the disclosure, by 'manufacturing history dataset', it should be understood a dataset comprising data which may come from one or more previous manufacturing campaigns during which transparent substrates were coated with a multi-layered coating in one or more coating systems. Preferably, the transparent substrate (1000) and the multi-layered coating (1002) manufactured during those manufacturing campaigns may be of same kind as those which are aimed to be manufactured with a coating process for which the method according to the invention is used to adjust the at least two coating process parameters.

According to some embodiments, the manufacturing history dataset (HDS3001) may comprise simulated or/and measured data. Simulated data may be advantageous when measured data are scarce and/or not reliable. They may be used as an alternative or as complement to measured data.

In the context of the disclosure, 'coating process parameter' should be interpreted as any parameter of the coating process which may relate to its functioning, operating and/or technical settings which may need to be adjusted to manufacture a coated transparent substrate according to given specifications. These parameters may vary according to the particular configuration of a coating process parameters, so that relevant coating process parameters for a first coating process may differ to those for a second but different one.

Examples of coating process parameters (CPP1, CPP2) may be gas flow, e.g. levels of water, oxygen, nitrogen or inert gases, cathode power set point or actual value, cathode voltage set point or actual value, magnetic fields, gas flows, gas partial pressures, gas total pressure, pumping capacity of the pumping systems, mechanical shields arrangement, geometric arrangement of magnetic devices, parameters of plasma emission and/or conveying speed of the substrates.

In some advantageous embodiments, the at least two coating process parameters (CPP1, CPP2) may be chosen among gas flows, cathode voltage or power, magnetic field intensity, setting and/or geometric arrangement of a mechanical device, conveying speed of the transparent substrates in a cell of the coating process (2000), or a combination thereof.

In the context of the disclosure, 'quality function' should not be interpreted as mathematical function but as related to particular technical feature or physicochemical property of the coated transparent substrate. In particular, it may relate to any intrinsic characteristic of the coated transparent substrate which may be observed, measured, or simulated without altering its identity.

Examples of quality function QF may be characteristic or features which may relate to optics, mechanics, energetics, chemistry, or application compatibility criteria, e.g., Head Up Display compatibility, of the coated transparent substrate. For examples, they may be optical properties, e.g., solar gain, light transmission coefficient, light reflection coefficient, or colour, of the coated substrate, and the homogeneity thereof as well. It may be a transmission and/or reflection electromagnetic spectrum. The electromagnetic spectra may be transmission and/or reflection spectra, acquired either on the coated side or on the non-coated side of the substrate. In particular, the electromagnetic spectra may be advantageously transmission and/or reflection spectra with an observation angle equal to or less than 10° or with an observation angle more than 45° in the 295 nm-2000 nm, preferentially in 330 nm-1100 nm wavelength range.

In advantageous embodiments, the at least one quality function (QF) may be chosen among optical, colorimetric, energetic, mechanical, electrical and/or chemical properties of the multi-layered coating (1000).

Once a coated transparent substrate is manufactured at step (b), a value (MP-V) of the at least one quality function (QF) of said coated transparent substrate may be either measured or predicted at step (c).

As an example, embodiment, a value (MP-V) of the at least one quality function (QF) may be predicted with prediction methods such as those disclosed in the European Patent Application 20315353.1 filed on 21 Jul. 2020.

A value (MP-V) of the at least one quality function (QF) may be measured with any adapted measuring methods and/or devices that are available in the art. Measurement may be performed in-line, i.e., inside the coating process, or off-line, i.e., outside the coating process. Example embodiments of in-line measurements may be measurements of a quality function on partially coated substrates at some stages of the coating process. Example embodiments of off-line measurements may be measurement performed at the end of the coating process once the transparent substrate is coated with the multi-layer coating substrate.

In a preferred embodiment, at step (c), a value (MP-V) of the at least one quality function (QF) of said coated transparent substrate may be measured at the end of the coating process.

Steps (a), (d) and (e) are computing steps in which differences of values are used as input or directly computed. These differences may be relative or absolute differences.

The machine learning methods onto which the mathematical prediction methods are based are matters of choice depending on the nature of the coating process parameters and of the quality function.

As example embodiments, the machine learning based methods may be weighed sum, weighed mean, genetic algorithm, supervised, unsupervised or reinforced machine learning regression methods, or cost optimization methods.

At step (g), the reiteration is performed according to two criteria: the targeted value (TV) for the quality function (QF) is reached according to a given error interval or until the variation of said at least two coating process parameters (CPP1; CPP2) is below a given threshold upon subsequent iteration.

The first criterion may relate to error which may be tolerated for the coated transparent substrates according to given technical requirements or specification for said coated transparent substrates. The value of error interval may then vary. In most cases, the given error interval may be 1% or less from the targeted value (TV).

The second criterion may allow to stop the reiteration when the values of said at least two coating process parameters (CPP1; CPP2) does not vary sufficiently upon subsequent iteration while the targeted value (TV) for the quality function (QF) is not yet reached. The criterion may be defined as threshold for the number of reiteration steps for which no signification variation in the values of said at least two coating process parameters (CPP1; CPP2) is observed. This threshold may be defined manually or automatically.

In some advantageous embodiments, step (g) may be performed for each model sequentially, in parallel and/or as chained models, each model being eventually affected with a weight factor. Such embodiments may help to counteract or counterbalance drifts that may potentially occur from one of them. They may also improve the accuracy and the precision of the differences ($\Delta$V-CPP) computed at step (c).

Determining which mathematical prediction models (MM1, MM2) to be set in the dataset (DS3003) may depend on their precision, their accuracy, and their convergence in modelling the at least two coating process parameters (CPP1, CPP2) to the at least one quality functions (QF).

Therefore, mathematical prediction methods may sometimes first be required to be evaluated.

Figure 4:
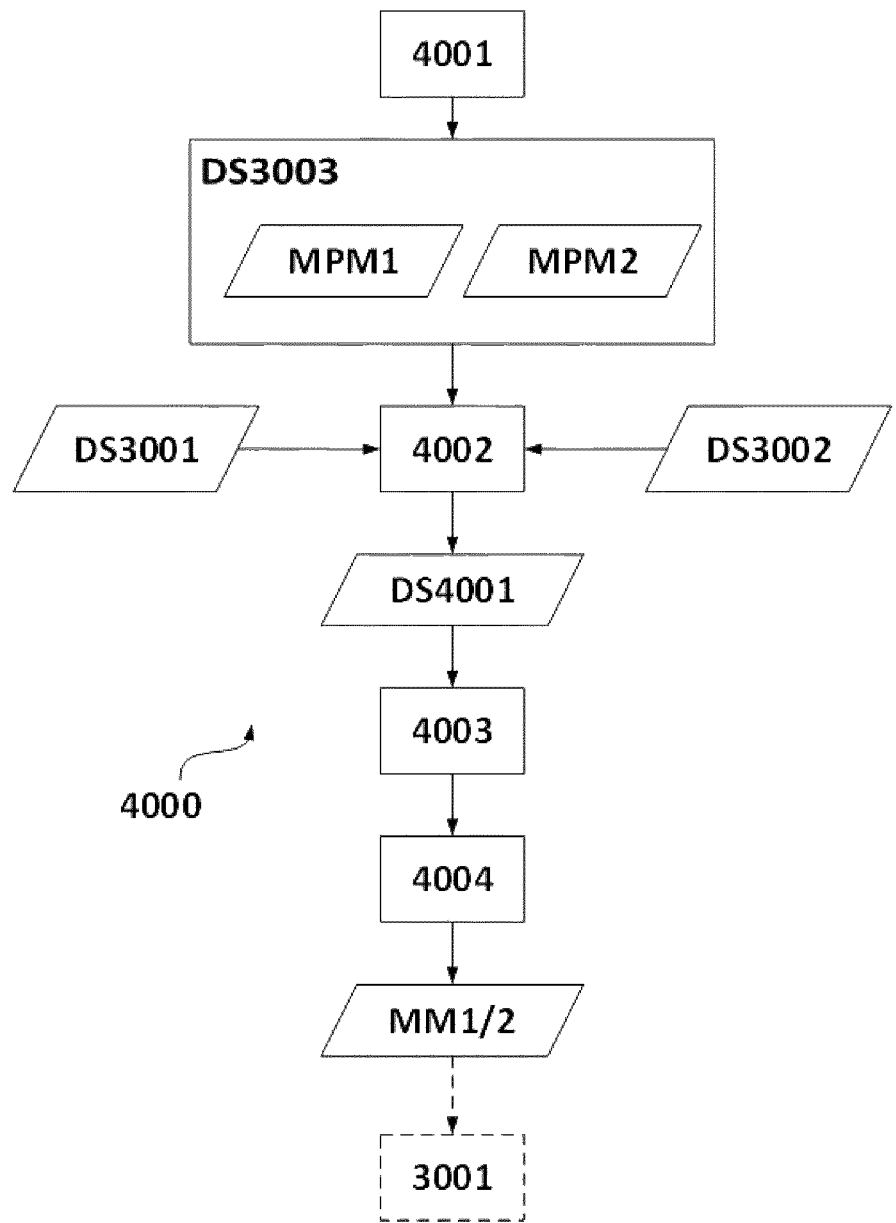
FIG. 4 is a flow chart of a method for adjusting coating process parameters according to another embodiment.

In this scope, according to further advantageous embodiments, with reference to [FIG. 4], each model of the dataset (DS3003) of the at least two different mathematical prediction models (MM1, MM2) may be defined according to the following steps:

(b1) generating (4001), on a computer, at least two different mathematical prediction models (MPM1, MPM2), each model being based on a different machine learning method;

(b2) calculating (4002), on a computer, a dataset (DS4001) of differences of values of said at least one quality function (QF) and differences of values of said at least two coating process parameters (CPP1, CPP2) from the dataset (DS3001) of values for said at least one quality function (QF) and the dataset (DS3002) of said at least two coating process parameters (CPP1, CPP2);

(b3) training (4003), on a computer, each mathematical prediction model on said set (ST4001) of differences;

(b4) selecting (4004) the trained mathematical prediction model for which the prediction error is the lowest, the selected mathematical prediction model being the mathematical prediction model to be used in the set (ST3003) of the at least two different mathematical prediction models (MM1, MM2).

Convergence may be considered as an important feature of the mathematical prediction model regarding their mid/long-term reliability. Indeed, a mathematical prediction model which may appear to converge after few trials may sometimes start diverging when there are some unexpected shifts in the data provided as input in prediction mode.

Figure 5:
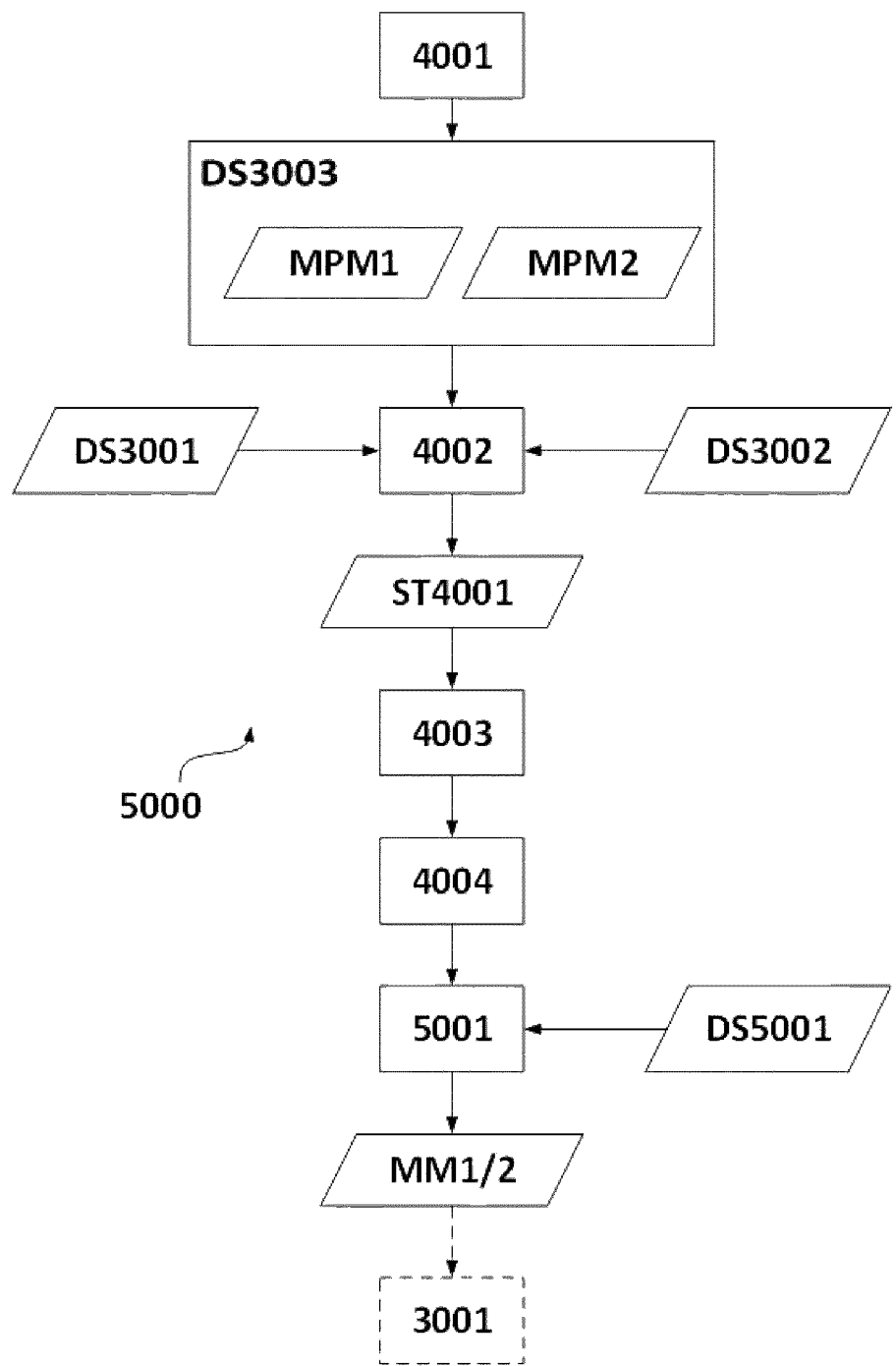
FIG. 5 is a flow chart of a method for adjusting coating process parameters according to other embodiments.

In this context, according to a preferred embodiment, with reference to [FIG. 5], the method (5000) may further comprise a step (b5) of selecting (5001) the trained mathematical prediction model which is the most convergent when it is provided with a dataset (DS5001) of differences of values of said at least one quality function (QF), said differences of values being further populated with measured and/or artificial noise.

The method according to the invention may not be limited to one quality function. It may take two, three or more quality functions.

Accordingly, in some preferred example embodiments, the method (3000,4000,5000) may further adjust at least two parameters (CPP1,CPP2) of a coating process (2000) to manufacture a coated transparent substrate (1000) comprising a multi-layered coating (1002) according to a targeted values (TV1,TV2) for two quality function (QF1,QF2) for said coated transparent substrate (1000), wherein a first quality function (QF1) is the optical spectra and a second quality function (QF2) is a colorimetric property, the targeted value (TV2) for said colorimetric property is a given value or a predicted value, at least one coating process parameter (CPP1) is the power of cathodes, and the dataset (DS3003) of at least two different mathematical prediction models (MM1,MM2) comprise a first mathematical prediction model (MM1) between differences of the optical spectra and differences of the powers of cathodes, and a second mathematical prediction model (MM2) between differences of the colorimetric property and differences of the powers of cathodes.

The mathematical prediction models (MM1, MM2) may sometimes need to be retrained, for instance when new data may be available for updating the datasets (DS3001, DS3002) or some data of the datasets (DS3001, DS3002)

may need to be corrected. Retraining may also be advantageous when some drifts in the prediction may occur.

Accordingly, in some embodiments, the method (3000, 4000,5000) may further comprise, after step (g), a step (h1) of performing again all steps (a) to (g) according to a given occurrence criterion and wherein said steps (a) to (g) are performed with the dataset (DS3001) of values for the at least one quality function (QF) and the dataset (DS3002) of values for the at least two coating process parameters (CPP1,CPP2) provided as input, and wherein the set (ST3002) of values for the at least two coating process parameters (CPP1,CPP2) is populated with new measured and/or simulated data.

The occurrence criterion should be interpreted as the frequency at which the steps (a) to (g) may need to be performed again. It may be provided manually or automatically according to a monitored parameter, e.g., a detected drift in prediction and/or the availability of fresh new data.

In advantageous embodiments, the targeted value (TV) for the at least one quality function (QF) may be a predicted value, wherein said method (3000,4000) may further comprise, after step (g), a step (h2) of performing again all steps (a) to (g) according to a given discrepancy criterion between the predicted targeted value and a measured value, and wherein the targeted value (TV) is updated according to a function of said measured value.

These embodiments may provide possibility to live update the targeted value for the quality function during the adjustment stage of the coating process. Such flexibility may be useful when one may want to change, on purpose or as a remedy, the technical requirements during the setup time and/or during the production time.

The method according to any embodiments described herein is adapted for building and automotive glasses. Accordingly, in preferred embodiments, the transparent substrate (1001) may be a mineral glass substrate or an organic substrate, and the multi-layered coating (1002) may comprise at least one dielectric layer and at least one functional metallic layer.

Some steps of the method according to the invention are computing steps and may be computer implemented. According to another aspect of the invention, there is provided a data processing system comprising means for carrying out said steps according to any of the embodiments described herein. Example of means for carrying out the method may be a device which may be instructed to carry out sequences of arithmetic or logical operations automatically to perform tasks or actions. Such device, also called computer, may comprise one or more Central Processing Unit (CPU) and at least a controller device that may be adapted to perform those operations. It may further comprise other electronic components like input/output interfaces, non-volatile or volatile storages devices, and buses that are communication systems for the data transfer between components inside a computer, or between computers. One of the input/output devices may be user interface for human-machine interaction, for example graphical user interface to display human understandable information.

Another object of the invention is to provide a computer program comprising instructions which, when the program is executed by a computer, cause the computer to carry out the steps of the method which may be computer implement according to any embodiments described herein.

Any kind of programming language, either compiled or interpreted, may be used to implement the steps of the method of the invention. The computer program may be part of a software solution, i.e., part of a collection of executable instructions, code, scripts, or the like and/or databases.

Another object of the invention is to provide a computer-readable medium comprising instructions which, when executed by a computer, cause the computer to carry out the steps of the method which may be computer implement according to any embodiments described herein.

The computer-readable storage may be a non-volatile storage or memory, for example hard disk drive or solid-state drive. The computer-readable storage may be removable storage media or a non-removable storage media as part of a computer.

Alternatively, the computer-readable storage may be a volatile memory inside a removable media. This can ease the deployment of the invention into many production sites.

The computer-readable storage may be part of a computer used as a server from which executable instructions may be downloaded and, when they are executed by a computer, cause the computer to carry out the steps of the method which may be computer implement according to any embodiments described herein.

Alternatively, the program may be implemented in a distributed computing environment, e.g., cloud computing. The instructions may be executed on the server to which client computers may connect and provide encoded data as inputs to the method of the invention. Once data are processed, the output may be downloaded and decoded onto the client computer or directly send, for example, as instructions. This kind of implementation may be advantageous as it may be realised in a distributed computing environment such as a cloud computing solution.

The invention claimed is:

1. A method for adjusting at least two parameters of a coating process to manufacture a coated transparent substrate comprising a multi-layered coating according to a targeted value for at least one quality function for said coated transparent substrate,
   wherein said method takes, as input, a dataset of values for at least one quality function and a dataset of values for at least two coating process parameters;
   wherein said datasets come from a manufacturing history dataset of coated transparent substrates in one or more coating systems;
   wherein said method provides, as output, optimized values for the at least two coating process parameters to manufacture said coating transparent substrate, and
   wherein said method comprises the following steps:
   (a) computing, on a computer, a dataset of at least two different mathematical prediction models between differences of the values of the at least one quality functions and differences of the values of the at least two coating process parameters,
      wherein said at least two different mathematical prediction models are based on different machine learning methods, and wherein said different machine learning methods are trained on differences of the values of the dataset for the at least one quality function as features data and on differences of the values of the dataset for the at least two coating process parameters as target data;
   (b) manufacturing a coated transparent substrate with standard values for the at least two process parameters;
   (c) measuring or predicting a value of the at least one quality function of said manufactured coated transparent substrate;

(d) computing, on a computer, the difference between the measured or predicted value of the said at least quality function and a targeted value for said at least one quality function;

(e) computing, on a computer, differences for the at least two coating process parameters from said difference of measured or predicted value for said at least one quality function with each mathematical prediction model of the dataset;

(f) manufacturing a coated transparent substrate with adjusted values for the at least two coating process parameters which are adjusted according to differences computed at step (e);

(g) reiterating steps (c) to (f) until the targeted value for the quality function is reached according to a given error interval or until the variation of said at least two coating process parameter is below a given threshold upon subsequent iteration, the values obtained for the at least two coating process parameters to reach said targeted value for the quality function are the optimized values of the said at least two coating process parameters.

2. The method according to claim 1, wherein step (g) is performed for each mathematical prediction model sequentially, in parallel and/or as chained models, each model being eventually affected with a weight factor.

3. The method according to claim 1, wherein each model of the dataset of the at least two different mathematical prediction models is defined according to the following steps:

(b1) generating, on a computer, at least two different mathematical prediction models, each model being based on a different machine learning method;

(b2) calculating, on a computer, a dataset of differences of values of said at least one quality function and differences of values of said at least two coating process parameters from the dataset of values for said at least one quality function and the dataset of said at least two coating process parameters;

(b3) training, on a computer, each mathematical prediction model on said set of differences;

(b4) selecting the trained mathematical prediction model for which the prediction error is the lowest, the selected mathematical prediction model being the mathematical prediction model to be used in the set of the at least two different mathematical prediction models.

4. The method according to claim 3, wherein said method further comprises a step (b5) of selecting the trained mathematical prediction model which is the most convergent when it is provided with a dataset of differences of values of said at least one quality function, said differences of values being further populated with measured and/or artificial noise.

5. The method according to claim 1, wherein the at least one quality function is chosen among optical, colorimetric, energetic, mechanical, electrical and/or chemical properties of the multi-layered coating.

6. The method according to claim 1, wherein the at least two coating process parameters are chosen gas flows, cathode voltage or power, magnetic field intensity, setting and/or geometric arrangement of a mechanical device, conveying speed of the transparent substrates in a cell of the coating process, or a combination thereof.

7. The method according to claim 1, further comprising adjusting at least two parameters of a coating process to manufacture a coated transparent substrate comprising a multi-layered coating according to a targeted values for two quality function for said coated transparent substrate, wherein a first quality function is the optical spectra and a second quality function is a colorimetric property, the targeted value for said colorimetric property is a given value or a predicted value, at least one coating process parameter is the power of cathodes, and the dataset of at least two different mathematical prediction models comprise a first mathematical prediction model between differences of the optical spectra and differences of the powers of cathodes, and a second mathematical prediction model between differences of the colorimetric property and differences of the powers of cathodes.

8. The method according to claim 1, further comprising, after step (g), a step (h1) of performing again all steps (a) to (g) according to a given occurrence criterion and wherein said steps (a) to (g) are performed with the dataset of values for the at least one quality function and the dataset of values for the at least two coating process parameters provided as input, and wherein the set of values for the at least two coating process parameters is populated with new measured and/or simulated data.

9. The method according to claim 1, wherein the targeted value for the at least one quality function is a predicted value, wherein said method further comprises, after step (g), a step (h2) of performing again all steps (a) to (g) according to a given discrepancy criterion between the predicted targeted value and a measured value, and wherein the targeted value is updated according to a function of said measured value.

10. The method according to claim 1, wherein the machine learning based methods are weighed sum, weighed mean, genetic algorithm, supervised, unsupervised or reinforced machine learning regression methods, or cost optimization methods.

11. The method according to claim 1, wherein the given error interval is 1% or less from the targeted value.

12. The method according to claim 1, wherein a manufacturing history dataset comprises simulated or/and measured data.

13. The method according to claim 1, wherein, at step (c), the value of the at least one quality function of said coated transparent substrate is a measured value which is measured at the end of the coating process.

14. The method according to claim 1, wherein the transparent substrate is a mineral glass substrate or an organic substrate, and the multilayered coating comprises at least one dielectric layer and at least one functional metallic layer.

15. The method according to claim 1, wherein the adjusted coating process parameters are adjusted according to the differences computed at step (e) by using an average, weighted combination, or selection of the outputs from each of the mathematical prediction models.

* * * * *